Aug. 29, 1961     H. MATENY     2,998,279
VEHICLE DIVIDER
Filed Jan. 9, 1959
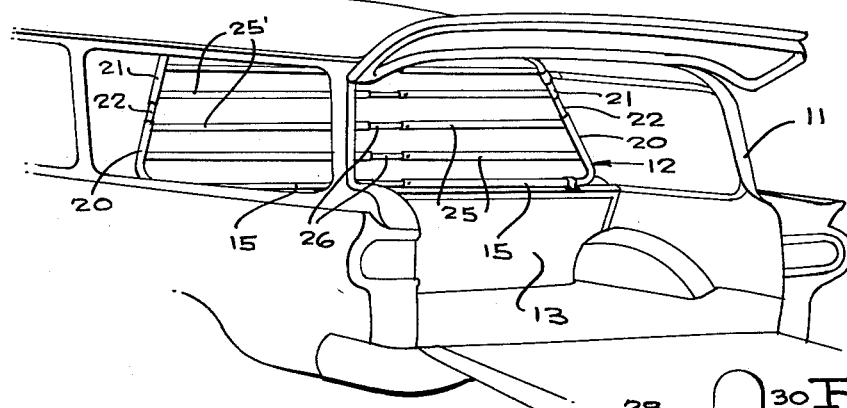
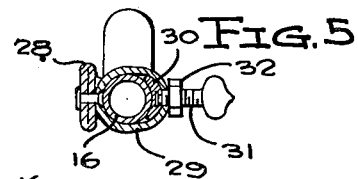
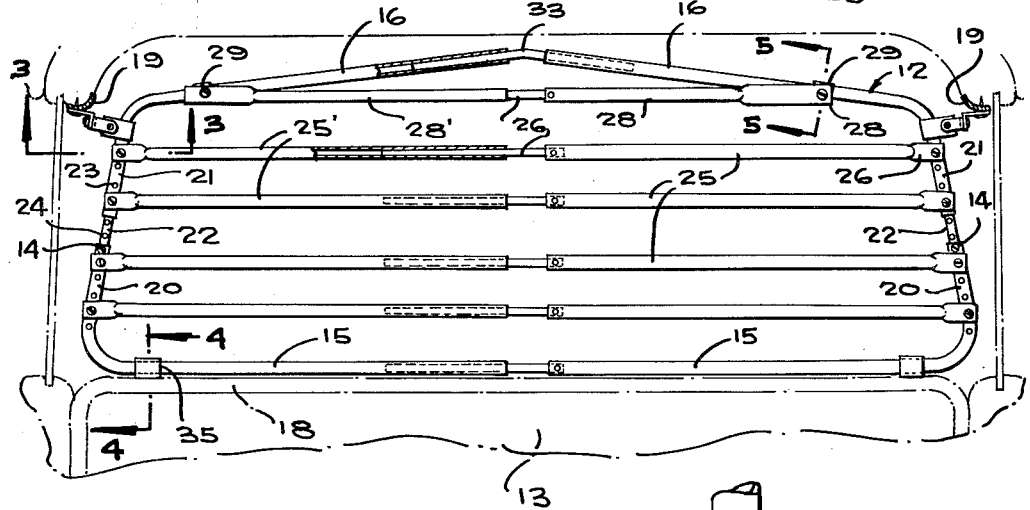
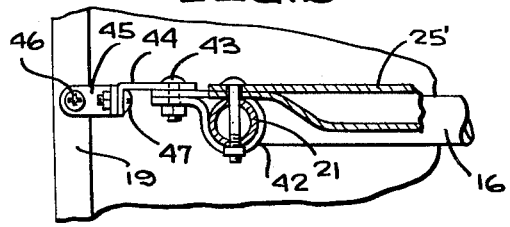
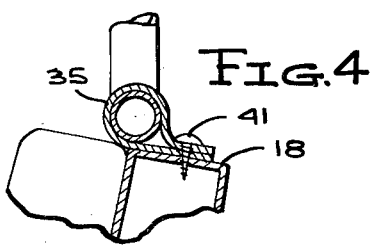
INVENTOR.
HENRY MATENY
BY
McMorrow, Berman & Davidson
ATTORNEYS United States Patent Office 2,998,279
Patented Aug. 29, 1961

2,998,279
VEHICLE DIVIDER
Henry Mateny, Cheltenham, Md.
(Germantown, Md.)
Filed Jan. 9, 1959, Ser. No. 785,907
5 Claims. (Cl. 296—24)

This invention relates to partition devices, and more particularly to an adjustable partition device for use in motor vehicles to separate one portion of a vehicle from another.

A main object of the invention is to provide a novel and improved adjustable divider device which may be employed in a motor vehicle, for example, in a station wagon, or the like, to separate a rear portion of the vehicle from a forward portion thereof, the device being simple in construction, being easy to install, and being easy to remove when its use is no longer required.

A further object of the invention is to provide an improved divider device for use in a motor vehicle, said device involving inexpensive components, being adjustable vertically and laterally, being durable in construction, and being adapted for installation without requiring the use of any special tools, the device serving to form a rear compartment in the vehicle which may be employed for animals, for a play area for children, or as a compartment for luggage wherein the luggage may be stacked to a substantial height without the risk of sliding forwardly into the forward portion of the vehicle.

Further objects and advantages of the invention will become apparent from the following description and claims, and from the accompanying drawings, wherein:

FIGURE 1 is a fragmentary rear perspective view of the rear portion of a station wagon in which is installed an improved divided device according to the present invention.

FIGURE 2 is an enlarged elevational view, partly in vertical cross section, of the divider device employed in FIGURE 1, illustrating the manner in which it is connected to adjacent portions of the motor vehicle in which it is installed.

FIGURE 3 is an enlarged cross sectional view taken on the line 3—3 of FIGURE 2.

FIGURE 4 is an enlarged cross sectional view taken on the line 4—4 of FIGURE 2.

FIGURE 5 is an enlarged cross sectional view taken on the line 5—5 of FIGURE 2.

Referring to the drawings, 11 designates a conventional station wagon in which is installed an improved divider device according to the present invention, the device being designated generally at 12.

As shown, the divider device 12 is installed immediately adjacent to the vehicle seat 13, being connected in a manner presently to be described to the top frame portion 18 of the seat and also being connected to the inside surfaces of the respective top window frame portions 19, 19 at the opposite sides of the vehicle, in the specific arrangement illustrated in the drawings.

The divider member 12 comprises a pair of opposing generally U-shaped main frame members designated generally at 14, 14, each of said frame members comprising a horizontal bottom arm 15 and an inwardly and upwardly inclined top arm 16, connected by respective end portions 20 and 21 to an intervening tubular element 22, whereby the spacing between the arms 15 and 16 is adjustable. The elements 20 and 21 are provided with spaced apertures 23 which are selectively registrable with apertures 24 provided in the intervening member 22 so that the members 20 and 21 may be fastened to the intervening member 22 is selected positions, providing a desired spacing between the bottom arm 15 and the top arm 16 of each U-shaped member.

As shown, the members are of tubular cross section, whereby the intervening element 22 may be telescopically received in the side portions 20 and 21 of the U-shaped frame members and whereby said side portions 20 and 21 may be telescopically adjusted relative to the intervening members 22.

Connected to the bight portions of one of the U-shaped frame members in vertically spaced relation are the respective horizontal cross bar members 25, said horizontal cross bar members being of tubular shape and having flattened end portions 26 which are secured to the bight portion of the associated U-shaped frame member. Similarly secured to the bight portion of the opposing U-shaped frame member are tubular horizontally extending cross bar elements 25' which are located so that they may be axially aligned with the cross bar elements 25. Secured in the cross bar elements 25 are the rod elements 26 which are telescopically engageable in the opposing cross bar elements 25', whereby the rod members 26 engage in the members 25' and allow the device to be adjusted in width.

Connected to the inclined top arm 16 above the cross bar members 25 is an additional cross bar member 28, said cross bar member being pivotally connected to a ring member 29 slidably engaged on the top arm element 16 and being provided with a clamping shoe 30 to which is rotatably connected a clamping screw 31, the clamping screw being threadedly engaged through a nut member 32 rigidly secured to the ring 29, as shown in FIGURE 5, whereby the shoe 30 may be adjusted inwardly to clampingly engage the member 16 and rigidly secure the ring 29 in an adjusted position on the member 16. The member 16 of the opposing U-shaped frame assembly is likewise provided with a cross bar element 28' pivoted thereto in the same manner as the first-described member 28 is pivoted to its arm 16, namely, in a manner whereby the ring member 29 associated therewith may be adjusted along the arm 16. An angled rod element 33 has its opposing end portions telescopically engaged in the ends of the top arms 16, 16, the intermediate bend of the member 33 being relatively slight, so that the end portions of the rod 33 are easily adjustable telescopically in the ends of the top arms 16, 16.

As shown in FIGURE 4, strap clamps 35 surround the opposite end portions of the lower arm 15 and overlie the rear seat frame portions 18, said strap clamps being secured to the seat frame portions 18 by suitable screws 41. Similar strap clamps 42 surround the upper portions of the members 21 and are pivotally connected by bolts 43 to angle brackets 44 which are in turn connected to additional angle brackets 45 secured to the upper inside window frame portions 19, as shown in FIGURE 3. The brackets 45 are fastened to the frame portions 19 by screws 46, the brackets 44 are fastened to the brackets 45 by bolts 47, and the brackets 44 are fastened to the strap clamps 42 by bolts 43, whereby universal adjustment of the brackets 44 and 45 is allowed, insuring that the brackets may be adjusted in accordance with the particular arrangement of the window frame portion 19 in the vehicle in which the device is being installed.

As will be readily apparent from the previous discussion, the device is adjustable both vertically and laterally and may be thus adjusted in accordance with the design of a vehicle in which it is to be installed. It is not necessarily installed on a seat but may be attached to any convenient portions of the vehicle so as to provide the desired division of the space in the vehicle. For example, in the arrangement illustrated the divider device 12 provides a separate rear compartment which may be employed to transport animals or as a play area for children, thus protecting the driver from annoyance or interference by the occupants of the rear compartment.

This enables the driver to give full attention to the operation of the vehicle. Furthermore, the rear compartment may serve as a luggage space, whereby the divider device acts as a safety retainer to prevent luggage or cargo which is stacked relatively high from sliding forward when the vehicle brakes are applied, thus protecting the driver or other occupants of the forward portion of the vehicle from injury or from impact by cargo carried in the rear portion of the vehicle.

The bracket devices employed in attaching the divider device are adjustable along the frame portions thereof, so that the existing screws in the adjacent portions of the vehicle may be employed as anchoring means. Thus, the screws 41 on the top portion of the seat frame 18 may be existing screws, and the screws 46 in the window frame may be the existing screws already present in said window frame.

While a specific embodiment of an improved divider device for use in a motor vehicle has been disclosed in the foregoing description, it will be understood that various modifications within the spirit of the invention may occur to those skilled in the art. Therefore it is intended that no limitations be placed on the invention except as defined by the scope of the appended claims.

What is claimed is:

1. For use in a vehicle which includes a roof, the vehicle having a compartment therein, and at least one seat structure extending transversely across the compartment, the seat structure having a top frame portion spaced downwardly of the roof thereby to define an open area between the top frame portion and the roof; a lateral and vertically adjustable vehicle divider adapted to close the open area comprising a pair of opposing, generally U-shaped main frame members having horizontal bottom arms, upwardly and inwardly inclined top arms and upstanding, extensible outer bight portions, vertically spaced aligned horizontal cross bar members secured to said bight portions, means telescopically connecting the inner ends of the top and bottom arms and cross bar members, and bracket means on the bight portions and bottom arms of the main frame members for attaching same to said vehicle.

2. For use in a vehicle which includes a roof, the vehicle having a compartment therein, and at least one seat structure extending transversely across the compartment, the seat structure having a top frame portion spaced downwardly of the roof thereby to define an open area between the top frame portion and the roof; a laterally and vertically adjustable vehicle divider adapted to close the open area comprising a pair of opposing, substantially U-shaped main frame members, each of said main frame members including a vertically adjustable bight from the opposed ends of which extend a top and a bottom arm, said bottom arms extending substantially perpendicularly from said bights, and the top arms being inclined upwardly in a direction away from the bights to which they are respectively connected, means connecting the inner ends of the top arms together, means connecting the inner ends of the bottom arms together, a plurality of cross bar members extending inwardly from the respective bights, means connecting the inner ends of corresponding cross bar members, a cross bar element slidably and pivotally connected to each of the top arms, means connecting the inner ends of said last named cross bar elements together, and bracket means on the bights and bottom arms for attachment of the divider to said vehicle.

3. For use in a vehicle which has a roof and laterally spaced sides, the sides each including window frame members, the vehicle having a compartment therein, and at least one seat structure extending transversely across the compartment intermediate its ends, the seat structure having a top frame portion spaced downwardly of the roof thereby to define an open area between the top frame portion and the roof; a laterally and vertically adjustable vehicle divider adapted to close the open area comprising a pair of oppositely disposed substantially U-shaped main frame members including vertically extensible bights adapted for connection with the sides of said vehicle, a bottom arm extending perpendicularly from each of said bights along said top frame portion, a top arm extending from each of the bights and inclined outwardly thereof adjacent said roof portion, a plurality of vertically spaced horizontal cross bar members secured to each of the bights, means telescopically connecting the inner ends of the top and bottom arms and the cross bar members, and bracket means on the bights and the bottom arms, the bracket means on the bights being releasably connected to the window frame member adjacent thereto, and the brackets on the bottom arms being secured to said top frame portion.

4. A vehicle divider as defined in claim 3, and a cross bar element pivotally and slidably secured to each of said top arms, and means telescopically connecting the inner ends of said last named cross bar elements together.

5. For use in a vehicle of the station wagon type which includes roof, the vehicle having a compartment therein including a forward passenger area and a rear luggage area, and a seat structure extending transversely across the compartment to separate the passenger and luggage areas from one another, the seat structure having a top frame portion spaced downwardly from the roof thereby to define an open area between the top frame and the roof, and the vehicle having window frames adjacent the seat structure; a laterally and vertically adjustable vehicle divider adapted to close the open area comprising a pair of oppositely disposed substantially U-shaped main frame members including vertically extensible bights adapted for connection with the window frames of the vehicle, a bottom arm extending perpendicularly from each of said bights along said top frame portion, a top arm extending from each of the bights and inclined outwardly thereof adjacent said roof, a cross bar element pivotally and slidably secured to each of said top arms, means telescopically connecting the inner ends of said last named cross bar elements, a plurality of vertically spaced horizontal cross bar members secured to each of the bights, means telescopically connecting the inner ends of the top and bottom arms and the cross bar members, and bracket means on the bights and the bottom arms, the bracket means on the bights being releasably connected to the window frame member adjacent thereto, and the brackets on the bottom arms being secured to said top frame portion.

References Cited in the file of this patent

UNITED STATES PATENTS

| Re. 17,911 | Rexinger | Dec. 23, 1930 |
| 123,122 | Palmberg | Jan. 30, 1872 |
| 1,459,522 | Woods | June 19, 1923 |
| 2,546,929 | Nampa | Mar. 27, 1951 |
| 2,645,789 | Wisner | July 21, 1953 |
| 2,720,414 | Hart | Oct. 11, 1955 |
| 2,733,952 | Wright | Feb. 7, 1956 |
| 2,799,530 | Drake | July 16, 1957 |
| 2,864,648 | Bland | Dec. 16, 1958 |
| 2,865,670 | Dunn | Dec. 23, 1958 |
| 2,884,279 | Halstead | Apr. 28, 1959 |
| 2,892,495 | Hadden | June 30, 1959 |

FOREIGN PATENTS

| 128,243 | Switzerland | Oct. 16, 1928 |